United States Patent [19]

Hinderer

[11] Patent Number: 4,524,185
[45] Date of Patent: Jun. 18, 1985

[54] HALOGEN-CONTAINING ELASTOMER COMPOSITION, AND VULCANIZING PROCESS USING DIMERCAPTOTHIODIAZOLE AND DITHIOCARBAMATE CURING SYSTEM

[75] Inventor: Robert F. Hinderer, Ann Arbor, Mich.

[73] Assignee: Federal-Mogul Corporation, Southfield, Mich.

[21] Appl. No.: 472,432

[22] Filed: Mar. 7, 1983

[51] Int. Cl.³ .............................. C08F 8/34; C08F 8/30
[52] U.S. Cl. ............................ 525/328.2; 525/328.9; 525/330.4; 525/331.1; 525/349; 525/352
[58] Field of Search ................. 525/330.4, 349, 328.9, 525/328.2, 331.1

[56] References Cited

U.S. PATENT DOCUMENTS 4,288,576 9/1981 Richwine .............................. 525/349
4,399,262 8/1983 Jalonski ............................... 525/349

FOREIGN PATENT DOCUMENTS 974915 11/1964 United Kingdom ................ 525/349

Primary Examiner—Christopher A. Henderson
Attorney, Agent, or Firm—Robert F. Hess

[57] ABSTRACT

The properties of halogen-containing elastomers are improved by incorporating into the elastomer before vulcanization from about 0.05 to about 3 parts by weight of dimercaptothiodiazole (DMTD), and from about 0.5 to about 5 parts by weight of a dithiocarbamate type accelerator per 100 parts of elastomer. Zinc di-n-butyldithiocarbamate and dimercaptothiodiazole in acrylic elastomers containing active chlorine is disclosed as a preferred combination.

22 Claims, No Drawings

HALOGEN-CONTAINING ELASTOMER COMPOSITION, AND VULCANIZING PROCESS USING DIMERCAPTOTHIODIAZOLE AND DITHIOCARBAMATE CURING SYSTEM

BACKGROUND AND SUMMARY OF THE INVENTION

This invention relates generally to the vulcanization of active halogen-containing elastomers such as copolymers and the use of curing agents or accelerators which control reaction time so as to allow the elastomer to flow into a mold while still maintaining an acceptable total cure time and surface quality of the vulcanized elastomer.

Ideally, an elastomer cure process would follow a rheometer cure curve wherein (i) the elastomer is heated rapidly as it is introduced into a warm mold and undergoes a limited amount of vulcanization or cross linking, (ii) the elastomer remains in a plastic, flowable state as it fills the mold, (iiI) after filling the mold, which should take less than one minute, the elastomer would ideally cure instantaneously by allowing all available or required cross linkage to occur at once so that the mold can be opened and the finished parts removed. As a practical matter, no elastomer can be cured in such an ideal manner, but improvements are constantly sought.

One problem that needs to be solved in formulating an improved cure system is finding the desired combination that will allow enough time for the elastomer to fill the mold while in the flowable state without unduly prolonging the total cure time. While acceptable cure systems have been developed for many commonly used elastomers, an efficient cure system has not been developed for halogen-containing elastomers that does not result in poor surface quality of the cured elastomer. For example, vulcanizing ingredients such as sodium stearate, which are commonly used to cure halogen-containing elastomers, result in blemishes visible at 40X magnification. A smooth blemish-free surface is essential for satisfactory performance of elastomeric seals.

The term "halogen-containing elastomers" is defined as those polymers and copolymers which contain a halogen atom as a substituent on a recurring unit in the polymer structure through which vulcanization can be achieved at least in part. Among the elastomers containing active halogens that are commercially available or known are included the following: butyl-isobutylene-isoprene copolymers containing at least one halogen selected from the group consisting of chlorine, bromine, and iodine such as described in U.S. Pat. Nos. 2,631,984, 2,681,899, 2,698,041, 2,700,997, 2,720,479, and 2,732,354, as well as those described in Rubber World, vol. 138, page 725 (1955) and Ind. Eng. Chem., vol. 47, page 1562 (1955), to which reference is made for further details, and the disclosures of which are hereby incorporated by reference; acrylates, such as copolymers of an acrylate as represented by ethyl acrylate and vinyl chloroethyl ether, 2-chloroethyl acrylate, vinyl haloacrylates typified by vinyl butyrate, and the like, wherein the halogens are as previously indicated and at least one is present on the alphacarbon of the acid involved and where additional comonomers may be employed along with the acrylate and the halogen-containing comonomer may be as described in U.S. Pat. No. 3,201,373, to which reference is made for further details, and the disclosure of which is hereby incorporated by reference; polyesters wherein halogens are present in the polymers through condensation of suitable amounts of appropriately substituted acids or glycols; halogenated polyethylene wherein about one atom of halogen is present per 6–7 atoms of carbon in the chain and some of the halogens are present in the form of $-SO_2X$ where X represents a halogen as previously defined; and copolymers of vinylidene chloride.

Various agents have been used or suggested for the curing of halogen-containing elastomers. Among the curing agents which have been suggested are ammonia and various primary and secondary amines. Unfortunately, for most purposes, ammonia and amines react too fast as curing agents in many uses. This is particularly true of elastomers based on acrylates and vinyl haloacrylates.

Improved curing systems for halogen-containing elastomers are known and relate to the use of curing agents such as the following: ammonium salts, ammonium salts plus alkyl halides, and ammonium salts plus alkaline earth metal oxides. Several such systems are shown in U.S. Pat. Nos. 3,324,088 and 3,458,461, which relate to the use of ammonium salts and alkali metal salts, respectively, and to which reference is made for further details and the disclosures of which are hereby incorporated by reference. While these curing systems offer several advantages over former systems, particularly ammonia and amines, there exists a continuing need for improved curing systems which are (i) effective with a variety of halogen-containing elastomers, (ii) capable of variation to control curing rates, (iii) improve surface quality, (iv) provide economic advantages, and (v) otherwise overcome deficiencies of the known systems.

Uses of halogen-containing elastomers vary widely and are influenced to some extent by the chemical nature of the elastomers, with the peferred use for a particular elastomer being one wherein maximum advantage is taken of the special chemical properties of the elastomer. For example, copolymers of an acrylate (such as acrylonitrile) and a vinyl-haloacrylate form oil-resistant molded products useful in the making O-rings, oil seals, gaskets and the like. It is also noteworthy that with many of the previously used curing agents it is necessary to post-cure the vulcanized article for an extended period of time at a temperature of about 150° C. (about 302° F.) in order to fully develop the physical properties desired in the vulcanizate.

It is therefore an object of this invention to provide upon known systems for curing reactive halogen-containing elastomers.

It is a further object of the present invention to provide a curing system which is economical and effective from the standpoint of improved elastomer flow in the mold and rate of cure while maintaining good surface quality.

Another object of this invention is the elimination of postcuring operations.

It is also an object of the present invention to improve the surface quality of the resulting elastomeric product.

In accordance with the present invention, the properties of halogen-containing elastomers are improved by incorporating into the elastomer before vulcanization from about 0.05 to about 3 parts by weight of dimercaptothiodiazole (DMTD), and from about 0.5 to about 5 parts by weight of a dithiocarbamate type accelerator per 100 parts of elastomer. Although the curing process of this invention is usable with any of the halogen-containing elastomers previously named, it is particularly valuable for curing those elastomers containing haloacrylate groups. Zinc di-n-butyldithiocarbamate and dimercaptothiodiazole in acrylic elastomers containing active chlorine is a preferred combination. The process of the present invention comprises mixing the unvulcanized elastomer with dimercaptothiodiazole and the dithiocarbamate accelerator, with or without N-(cyclohexylthio)-phthalimide vulcanization inhibitor and other additives. The compounding can be done on a rubber mill or internal mixer by conventional procedures. The compounded elastomer is then cured at an elevated temperature, typically in a heated mold.

Additional benefits and advantages of the present invention will become apparent upon a reading of the detailed description of the preferred embodiments taken in conjunction with the accompanying examples.

DESCRIPTION OF THE PREFERRED EMBODIMENTS

In preparing compositions according to the present invention and in carrying out the process or method of the present invention, the vulcanization of the elastomers results from chemical reactions with dimercaptothiodiazole. Active halogen-containing elastomers usable with the present invention include those of the type referred to hereinabove, including those referred to in U.S. Pat. Nos. 3,324,088 and 3,458,461 (which have been incorporated herein by reference); copolymers of ethyl acrylate and vinyl chloroethyl ether; copolymers of an alkyl acrylate and vinyl chloroacetate; copolymers of ethyl acrylate and vinyl chloroacetate; terpolymers of a lower alkyl acrylate, cyanoethyl acrylate, and vinyl chloroacetate; and such terpolymers wherein the lower alkyl acrylate comprises ethyl acrylate.

The dimercaptothiodiazole (DMTD) used in accordance with the present invention should generally be present in an amount of from about 0.05% to about 3.0%, and preferably in an amount of from about 0.2% to about 1.0%, based on the weight of the elastomer. In other words, from about 0.05 to about 3.0 parts by weight of DMTD, and preferably from about 0.2 to about 1.0 parts by weight of DMTD should be used per 100 parts of elastomer.

Speed of rotation may be controlled by the chemical activity of the dithiocarbamate type accelerator used. Dithiocarbamate accelerators which may be used include bismuth dimethyldithiocarbamate, cadmium diamyldithiocarbamate, cadmium diethyldithiocarbamate, copper dimethyldithiocarbamate, lead diamyldithiocarbamate, lead dimethyldithiocarbamate, selenium diethyldithiocarbmate, selenium dimethyldithiocarbamate, tellurium diethyldithiocarbamate, zinc diamyldithiocarbamate, zinc di-n-butyldithiocarbamate, zinc diethyldithiocarbamate, zinc dimethyldithiocarbamate, zinc-N-ethyl phenyl dithiocarbamate, zinc-N-pentamethylene dithiocarbamate, pentamethylene-ammonium-N-pentamethylene dithiocarbamate, and the like, as well as mixtures thereof. Zinc di-n-butyldithiocarbamate, which is also known as zinc dibutyldithiocarbamate, is available from R. T. Vanderbilt Co. under the designation "Butyl Zimate". The dithiocarbamate type accelerator should generally be present in an amount of from about 0.5% to about 5.0%, and preferably in an amount of from about 1.5% to about 3.0%, based on the weight of the elastomer.

The speed of reaction can further be reduced by the use of N-(cyclohexylthio)-phthalimide vulcanization inhibitor such as is available in elastomeric dispersion form from Wyrough and Loser, Inc. under the designation "S(PVI)D50", which is an elastomeric dispersion containing 50% N-(cyclohexylthio)-phthalimide. The N-(cyclohexylthio)-phthalimide chemical itself ("Santogard PVI") is available from Monsanto Industrial Chemicals Co., which supplies the same to Wyrough and Loser, Inc. for inclusion in its elastomer dispersion. For best results, the elastomeric dispersions of "Santogard PVI" designated as "S(PVI)D50" are used. Reference to 50% N-(cyclohexylthio)-phthalimide in the examples hereinbelow refers to "S(PVI)D50". The cure systems may be effectively retarded with an amount of N-(cyclohexylthio)-phthalimide in the range of from about 0.01% to about 3.0%, and preferably in an amount of from about 0.1% to about 0.5%, based on the weight of the elastomer. Further control is possible by adding to the cure system an acid such as stearic acid to retard the curing rate.

As is well known in the art, other additives commonly used to compound elastomers may be added at the time the elastomer is compounded. These additives include carbon black (such as ASTM standard grades N650, FEF-N550, GPF-N650, MT-N990, etc.); powdered graphite; synthetic graphite such as that available from Superior Graphite Co. under the designation grade "5033X"; process aids such as "Vanfre AP2" (a proprietary material available from R. T. Vanderbilt Co. of Norwalk, Conn.); "Span 60" (a sorbitan monostearate material available from ICI America Inc.-Atlas Powder Co.); "PPA 790" (a proprietary material available from the 3M Company); antioxidants such as dibetanaphthyl-p-phenylenediamine, substituted diphenylamine such as that available from Uniroyal Chemical Co. under the designation "Naugard 445", and the like; pigments; plasticizers such as that available from Arizona Chemical Co. under the designation "Arizona 208"; accelerators; stabilizers such as calcium hydroxide (which may also function as a vulcanizer in some instances), as well as calcined magnesium oxide as available from Merck Co. under the designation "Maglite D"; curing agents such as zinc oxide; and the like.

The compounded elastomers are vulcanized by standard and conventional procedures. Curing temperatures above 300° F. are recommended.

In order to further describe and illustrate the composition and process of the present invention, the following examples are provided. It will be understood that these examples are provided for illustrative purposes and are not intended to be limiting of the scope of the invention as herein described and as set forth in the subjoined claims.

EXAMPLE 1

Five batches of a vulcanizable composition prepared in accordance with the present invention are compounded using the formulations shown in Table I. "Cyanacryl R", a polyacrylate with 1.0% nominal chlorine content, as available from American Cyanamid Co., is used as the elastomer in this example. The Mooney scorch rates (a conventional and well-known test commonly used in this art) are shown as "$t_5$", which represents the time in minutes for a 5-point increase in the Mooney viscosity at the temperature of measurement.

TABLE I

| | A | B | C | D | E |
|---|---|---|---|---|---|
| | | | Parts | | |
| Elastomer | 100 | 100 | 100 | 100 | 100 |
| Stearic acid | 2 | 2 | 2 | 2 | 2 |
| Process aid (Vanfre AP2) | 2 | 2 | 2 | 2 | 2 |
| Carbon black (N 650) | 50 | 50 | 50 | 50 | 50 |
| Synthetic graphite (5033X) | 40 | 40 | 40 | 40 | 40 |
| Dibetanaphthyl-p-phenylenediamine | 1 | 1 | 1 | 1 | 1 |
| Dimercaptothiodiazole (DMTD) | 0.6 | 0.6 | 0.6 | 0.6 | 0.6 |
| Zinc dimethyldithiocarbamate | 3 | — | — | — | — |
| Zinc diethyldithiocarbamate | — | 3 | — | — | — |
| Zinc di-n-butyldithiocarbamate | — | — | 3 | 2 | 2 |
| 50% N—(cyclohexylthio)-phthalimide | — | — | 1 | — | 1 |
| $t_5$ at 250° F. | 3.8 | 4.2 | 10.0 | 8.3 | 8.5 |

Samples of the compounded elastomers are vulcanized by heating at 375° F. for the length of time shown in Table II. The physical propeties of the vulcanized elastomers are also shown in Table II.

TABLE II

| | A | B | C | D | E |
|---|---|---|---|---|---|
| Vulcanization time (minutes) | 3 | 3 | 3 | 3 | 3 |
| Tensile strength (psi) | 1075 | 1000 | 1000 | 1100 | 1080 |
| Elongation (percent) | 305 | 300 | 310 | 250 | 252 |
| Modulus, 100% (psi) | 600 | 550 | 510 | 650 | 600 |
| Hardness, Shore A | 72 | 71 | 72 | 73 | 72 |

Oscillating disk cure meter data on the five batches of compounded elastomers from Table I is measured using ASTM standard test D 2084-81, to which reference is made for further details and which is hereby incorporated by reference. The test conditions are 1° arc, 375° F., no delay, 100 cpm, range 0–50 (lbf.in.), and 6 minutes full scale chart time. The cure meter properties are shown in Table III. (Needless to say, in this example, as in the other examples herein, oscillating disk cure meter data is taken on samples of the various batches prior to vulcanization.)

TABLE III

| | A | B | C | D | E |
|---|---|---|---|---|---|
| $T_s1$ (minutes) | 0.32 | .40 | .68 | .55 | .60 |
| $M_{HF}$ (lbf · in.) | 24.3 | 20.9 | 24.6 | 28.5 | 23.2 |
| $t'90$ (minutes) | 3.2 | 1.9 | 2.6 | 1.9 | 2.7 |

EXAMPLE 2

Four batches of a vulcanizable composition prepared in accordance with the present invention are compounded using the formulations shown in Table IV. "Cyanacryl R" is also used as the elastomer in this example.

TABLE IV

| | A | B | C | D |
|---|---|---|---|---|
| Elastomer | 100 | 100 | 100 | 100 |
| Stearic acid | 2 | 2 | 2 | 2 |
| Process aid (Vanfre AP2) | 2 | 2 | 2 | 2 |
| Carbon black (N650) | 50 | 50 | 50 | 50 |
| Synthetic graphite (5033X) | 40 | 40 | 40 | 40 |
| Dibetanaphthyl-p-phenylenediamine | 1 | 1 | 1 | 1 |
| Dimercaptothiodiazole (DMTD) | 0.6 | 0.6 | 0.6 | 0.6 |
| Zinc dimethyldithiocarbamate | 3 | — | — | — |
| Zinc diethyldithiocarbamate | — | 3 | — | — |
| Zinc di-n-butyldithiocarbamate | — | — | 2 | 2 |
| 50% N—(cyclohexylthio)-phthalimide | 0.6 | 0.6 | — | 0.6 |

Samples of these compounded elastomers are vulcanized by heating at 375° F. for the length of time shown in Table V. The physical properties of the vulcanized elastomers are shown in Table V.

TABLE V

| | A | B | C | D |
|---|---|---|---|---|
| Vulcanization time (min.) | 3 | 3 | 3 | 3 |
| Tensile strength (psi) | 1215 | 1105 | 1100 | 1100 |
| Elongation (percent) | 262 | 266 | 273 | 312 |
| Modulus, 100% (psi) | 660 | 600 | 650 | 555 |
| Hardness, Shore A | 75 | 74 | 77 | 76 |

Oscillating disk cure meter data is measured as in the previous example. The test conditions are 1° arc, 375° F., no delay, 100 cpm, range 0–50 (lbf.in.), and 6 minutes full scale chart time. The cure meter properties are shown in Table VI.

TABLE VI

| | A | B | C | D |
|---|---|---|---|---|
| $t_s1$ (minutes) | 0.38 | 0.54 | 0.80 | 0.80 |
| $M_{HF}$ (lbf · in.) | 24.8 | 23.0 | 25.2 | 23.8 |
| $t'90$ (minutes) | 3.6 | 2.2 | 2.1 | 2.3 |

EXAMPLE 3

Four batches of a vulcanizable composition prepared in accordance with the present invention are compounded using the formulations shown in Table VII. "Hycar" polyacrylate elastomers, under the different numbers shown below, as available from B. F. Goodrich Chemical Co., are used as the elastomers in this example. As in Example 1, the Mooney scorch rates are shown as $t_5$ and represent the time in minutes for a 5-point increase in the Mooney viscosity at 250° F.

TABLE VII

| | A | B | C | D |
|---|---|---|---|---|
| Hycar 4051 | 100 | — | — | — |
| Hycar 4042 | — | 100 | — | — |
| Hycar 4041 | — | — | 100 | — |
| Hycar 4043 | — | — | — | 100 |
| Stearic acid | 2 | 2 | 2 | 2 |
| Process aid (Vanfre AP2) | 2 | 2 | 2 | 2 |
| Carbon black (N650) | 50 | 50 | 50 | 50 |
| Synthetic graphite (5033X) | 40 | 40 | 40 | 40 |
| Dibetanaphthyl-p-phenylenediamine | 1 | 1 | 1 | 1 |
| Dimercaptothiodiazole (DMTD) | 0.6 | 0.6 | 0.6 | 0.6 |
| Zinc di-n-butyldithiocarbamate | 3 | 3 | 3 | 3 |
| $t_5$ at 250° F. | 12.0 | 9.3 | 15.0 | 15.0 |

Samples of the compounded elastomers are vulcanized by heating at 375° F. for the length of time shown in Table VIII. The physical properties of the vulcanized elastomers are also shown in Table VIII.

TABLE VIII

| | A | B | C | D |
|---|---|---|---|---|
| Vulcanization time (min.) | 3 | 3 | 3 | 3 |
| Tensile strength (psi) | 1225 | 920 | 999 | 800 |
| Elongation (percent) | 309 | 254 | 401 | 181 |
| Modulus, 100% (psi) | 720 | 550 | 575 | 545 |

TABLE VIII-continued

|  | A | B | C | D |
|---|---|---|---|---|
| Hardness, Shore A | 75 | 69 | 75 | 69 |

Oscillating disk cure meter data is also measured. The test conditions are 1° arc, 375° F., no delay, 100 cpm, range 0–50 (lbf.in.), and 6 minutes full scale chart time. The cure meter measured properties are shown in Table IX.

TABLE IX

|  | A | B | C | D |
|---|---|---|---|---|
| $t_s1$ (minutes) | 0.95 | 1.10 | 1.40 | 1.60 |
| $M_{HF}$ (lbf · in.) | 17.0 | 17.5 | 16.5 | 14.7 |
| t'90 (minutes) | 4.0 | 3.8 | 3.8 | 4.8 |

EXAMPLE 4

Polyacrylate elastomers "Cyanacryl L" and "Cyanacryl C", both as available from American Cyanamid Co., and "Hycar 4043", as available from B. F. Goodrich Chemical Co., are compounded without stearic acid as shown in the formulations in Table X. As in previous Examples 1 and 3, the Mooney scorch rate is shown as $t_5$ and represents the time in minutes for a 5-point increase in the Mooney viscosity at 250° F.

TABLE X

|  | A | B | C |
|---|---|---|---|
| Cyanacryl L | 100 | — | — |
| Cyanacryl C | — | 100 | — |
| Hycar 4043 | — | — | 100 |
| Process aid (Span 60) | 1 | 1 | 1 |
| Carbon black (N650) | 50 | 50 | 50 |
| Synthetic graphite (5033X) | 40 | 40 | 40 |
| Dibetanaphthyl-p-phenylenediamine | 1 | 1 | 1 |
| Dimercaptothiodiazole (DMTD) | 0.6 | 0.6 | 0.6 |
| Zinc di-n-butyldithiocarbamate | 2 | 2 | 2 |
| $t_5$ at 250° F. | 6.3 | >20.0 | >20.0 |

Samples of the compounded elastomers are vulcanized by heating at 375° F. for 3 minutes. The physical properties are shown in Table XI.

TABLE XI

|  | A | B | C |
|---|---|---|---|
| Tensile strength (psi) | 1050 | 1100 | 885 |
| Elongation (percent) | 266 | 129 | 169 |
| Modulus, 100% (psi) | 720 | 975 | 630 |
| Hardness, Shore A | 75 | 75 | 70 |

Oscillating disk cure meter data is also measured. The test conditions are 1° arc, 375° F., no delay, 100 cpm, range 0–50 (lbf.in.), and 12 minutes full scale chart time. The cure meter properties are shown in Table XII.

TABLE XII

|  | A | B | C |
|---|---|---|---|
| $t_s1$ (minutes) | 0.7 | 0.9 | 1.3 |
| $M_{HF}$ (lbf · in.) | 24.8 | 27.4 | 22.5 |
| t'90 (minutes) | 4.9 | 4.7 | 5.5 |

EXAMPLE 5

Polyacrylate elastomers "Cyanacryl R", as available from American Cyanamid Co., and "Hycar 4051CG", as available from B. F. Goodrich Chemical Co., are compounded with DMTD and lead diamyldithiocarbamate. The DMTD and lead diamyldithiocarbamate are liquid at room temperature. This prevents formation of 40X microscopic blemishes in the product. The formulations used are shown in Table XIII along with the Mooney scorch rate ($t_5$) at 250° F. measured as in previous example.

TABLE XIII

|  | A | B |
|---|---|---|
| Cyanacryl R | 100 | 50 |
| Hycar 4051CG | — | 50 |
| Stearic acid | 2 | 2 |
| Process aid (PPA 790) | 2 | 2 |
| Carbon black (FEF-N550) | 45 | 45 |
| Synthetic graphite (5033X) | 40 | 40 |
| Substituted diphenylamine (Nangard 445) | 1 | 1 |
| Dimercaptothiodiazole (DMTD) | 0.6 | 0.6 |
| Lead diamyldithiocarbamate | 2 | 2 |
| $t_5$ minutes at 250° F. | 5.2 | 4.3 |

Physical properties after vulcanization for 3 minutes at 375° F. are shown in Table XIV.

TABLE XIV

|  | A | B |
|---|---|---|
| Tensile strength (psi) | 1125 | 1195 |
| Elongation, (percent) | 309 | 245 |
| Modulus, 100% (psi) | 700 | 760 |
| Hardness, Shore A | 73 | 77 |

Oscillating disc cure meter data is measured. The test conditions are 1° arc, 375° F., no delay, 100 cpm, range 0–50 (lbf.in.), and 12 minutes full scale chart time. The cure meter measured properties are shown in Table XV.

TABLE XV

|  | A | B |
|---|---|---|
| $t_s1$ (minutes) | 0.7 | 0.8 |
| $M_{HF}$ (lbf · in.) | 26.9 | 24.0 |
| t'90 (minutes) | 6.6 | 7.0 |

EXAMPLE 6

Chloroprene elastomer "Neoprene W", as available from E. I. du Pont de Nemours & Co., chlorobutyl elastomer "HT 1066", as available from Exxon Corp., and fluorocarbon elastomer "Viton E60", as available from E. I. du Pont de Nemours & Co., are compounded with DMTD and zinc diethyldithiocarbamate. The formulations used are shown in Table XVI.

TABLE XVI

|  | A | B | C |
|---|---|---|---|
| Neoprene W | 100 | — | — |
| Chlorobutyl HT1066 | — | 100 | — |
| Viton E60 | — | — | 100 |
| Calcined magnesium oxide (Maglite D) | 4 | — | 3 |
| Zinc oxide | 5 | 4 | — |
| Carbon black (GPF-N650) | 50 | 50 | — |
| Plasticizer (Arizona 208) | 10 | — | — |
| Carbon black (MT-N990) | — | — | 20 |
| Calcium hydroxide | — | — | 6 |
| DMTD | 0.6 | 0.6 | 0.6 |
| Zinc diethyldithiocarbamate | 2 | 2 | 2 |

Oscillating disk cure meter data is measured using 1° arc, 350° F., no delay, 100 cpm, range 0–50 (lbf.in.), and 12 minutes full scale chart time. The cure meter measured properties are shown in Table XVII.

TABLE XVII

|  | A | B | C |
|---|---|---|---|
| $t_s1$ (minutes) | 2.55 | 0.40 | 8.90 |
| $M_L$ (lbf · in.) | 10.2 | 14.5 | 3.5 |
| $M_H$ (lbf · in.) | 14.4 | 26.5 | 5.0 |

The oscillating disk cure meter data shows that the DMTD—zinc diethyldithiocarbamate cure system is effective in chlorobutyl. The cure meter results show that in chloroprene and fluorocarbon elastomers the cure rate of the DMTD system is too slow to be of effective use.

A sample of the chlorobutyl formulation (compound B in Table XVI) is vulcanized by heating at 350° F. for 3 minutes. The physical properties are shown in Table XVIII.

TABLE XVIII

|  | A | B | C |
|---|---|---|---|
| Tensile strength (psi) | — | 2400 | — |
| Elongation (percent) | — | 309 | — |
| Modulus, 100% (psi) | — | 460 | — |
| Hardness, Shore A | — | 64 | — |

EXAMPLE 7

Polyacrylic elastomers "Noxtite PA-401" and "Noxtite PA-402", as available from Nippon Oil Seal Industry Co., Ltd., are compounded using the DMTD and zinc diethyldithiocarbamate cure system shown in Table XIX.

TABLE XIX

|  | A | B |
|---|---|---|
| Noxtite PA-401 | 100 | — |
| Noxtite PA-402 | — | 100 |
| Stearic acid | 1 | 1 |
| Carbon black (N650) | 50 | 50 |
| Synthetic graphite | 40 | 40 |
| Dibetanaphthyl-p-phenylenediamine | 1 | 1 |
| DMTD | 0.6 | 0.6 |
| Zinc diethyldithiocarbamate | 2 | 2 |

Samples of the compounded elastomers are vulcanized by heating at 375° F. for 3 minutes. The physical properties are shown in Table XX.

TABLE XX

|  | A | B |
|---|---|---|
| Tensile strength | 1080 | 1000 |
| Elongation (percent) | 300 | 232 |
| Modulus, 100% (psi) | 705 | 600 |
| Hardness, Shore A | 77 | 68 |

Oscillating disk cure meter data is also measured. The test conditions are 1° arc, 375° F., no delay, 100 cpm, range 0–50 (lbf.in.), and 12 minutes full scale chart time. The cure meter measured properties are shown in Table XXI.

TABLE XXI

|  | A | B |
|---|---|---|
| $t_s1$ (minutes) | 0.50 | 0.60 |
| $M_{HF}$ (lbf · in.) | 28.4 | 27.0 |
| t'90 (minutes) | 3.03 | 3.20 |

EXAMPLE 8

Additional batches of vulcanizable compositions prepared in accordance with the present invention are compounded using "Cyanacryl R" and using the formulations shown in Table XXII. The Mooney Scorch rate at 250° F. is also given.

TABLE XXII

|  | A | B | C | D |
|---|---|---|---|---|
| Cyanacryl R | 100 | 100 | 100 | 100 |
| Stearic Acid | 2 | 2 | 2 | 2 |
| Process Aid (Vanfre AP2) | 2 | 2 | 2 | 2 |
| Carbon Black (N650) | 50 | 50 | 50 | 50 |
| Substituted diphenylamine (Naugard 445) | 2 | 2 | 2 | 2 |
| Dimercaptothiodiazole (DMTD) | 0.05 | 3.0 | 0.6 | 0.6 |
| Zinc di-n-butyldithiocarbamate | 2.0 | 2.0 | 0.5 | 5.0 |
| $t_5$ at 250° F. | 20.1 | <1.0 | 9.6 | 4.8 |

Samples of the compounded elastomers are vulcanized by heating at 375° F. for the length of time shown in Table XXIII. The physical properties of the vulcanized elastomers are also shown.

TABLE XXIII

|  | A | B | C | D |
|---|---|---|---|---|
| Vulcanization time (min.) | 3 | 3 | 3 | 3 |
| Tensile strength (psi) | 380 | 1233 | 1400 | 1400 |
| Elongation (percent) | 972 | 346 | 459 | 349 |
| Modulus, 100% (psi) | 120 | 280 | 350 | 375 |
| Hardness, Shore A | 56 | 67 | 63 | 65 |

Data after the elastomers are aged 70 hours at 302° F. in an air oven per ASTM D 573 (to which reference is made for details and which is hereby incorporated by reference) is shown in Table XXIV. Plied compression set is tested after 70 hours at 302° F. following ASTM D 395 (to which reference is also made for details and which is also hereby incorporated by reference).

TABLE XXIV

|  | A | B | C | D |
|---|---|---|---|---|
| Tensile strength, (psi) | 740 | 2130 | 1625 | 1510 |
| Elongation (percent) | 429 | 149 | 252 | 391 |
| Modulus, 100% (psi) | 240 | 1500 | 575 | 475 |
| Hardness, Shore A | 66 | 79 | 76 | 80 |
| Plied Compression Set, ASTM D 395 | 102.8 | 81.5 | 76.1 | 46.0 |

Oscillating disk cure meter data is measured using 1° arc, 375° F., no delay, 100 cpm, range 0–50 (lbf in.), and 12 minutes full scale chart time.

TABLE XXV

|  | A | B | C | D |
|---|---|---|---|---|
| $t_s1$ (minutes) | 3.90 | .68 | 1.50 | .75 |
| $M_L$ (lbf in.) | 4.3 | 5.8 | 4.5 | 4.5 |
| $M_H$ (lbf in.) | 6.3 | 20.6 | 15.5 | 19.8 |

EXAMPLE 9

Polyacrylic elastomers are generally required to have resistance to heat degradation. The use of zinc (such as zinc oxide in particular), in a halogen-containing polymer, can lead to loss of heat deterioration resistance in some halogen containing polymers. A DMTD cure system with zinc di-n-butyldithiocarbamate acceleration is compared to accleration with lead dimethyldithiocarbamate and with dibasic lead phosphite added. Lead is frequently used to stabilize halogen containing polymers. "Dyphos XL" dibasic lead phosphate, as available from National Lead Co. is used.

Three batchs of vulcanizable compositions are compounded by the formulations shown in Table XXVI. "Cyanacryl R" is used as the elastomer.

TABLE XXVI

|  | A | B | C |
|---|---|---|---|
| Cyanacryl R | 100 | 100 | 100 |
| Stearic acid | 2 | 2 | 2 |
| Process aid (Vanfre AP2) | 2 | 2 | 2 |
| Carbon black (N650) | 50 | 50 | 50 |
| Substituted diphenylamine (Naugard 445) | 1 | 1 | 1 |
| Dimercaptothiodiazole (DMTD) | 0.6 | 0.6 | 0.6 |
| Zinc di-n-butyldithiocarbamate | 2 | — | 2 |
| Dibasic lead phosphite (Dyphos XL) | — | — | 5 |
| Lead dimethyldithiocarbamate | — | 2 | — |

Samples of the compounded elastomers are then vulcanized by heating at 375° F. for 3 minutes. The physical properties of the vulcanized elastomers as molded and after aging for 70 hours in a 302° F. air oven per ASTM D 573 are shown in Table XXVII.

TABLE XXVII

|  | A | B | C |
|---|---|---|---|
| AS MOLDED |  |  |  |
| Tensile strength (psi) | 1545 | 1410 | 1080 |
| Elongation (percent) | 406 | 392 | 710 |
| Modulus, 100% (psi) | 400 | 330 | 180 |
| Hardness, Shore A | 60 | 62 | 59 |
| AGED |  |  |  |
| Tensile strength (psi) | 1715 | 2050 | 1800 |
| Elongation (percent) | 367 | 156 | 256 |
| Modulus, 100% (psi) | 480 | 1160 | 660 |
| Hardness, Shore A | 72 | 74 | 71 |
| Plied compression set (ASTM D 395) | 49.6 | 81.4 | 95.6 |

Table XXVI data shows that the zinc di-n-butyldithiocarbamate accelerator system with DMTD produces a polyacrylic vulcanizate capable of resisting heat of 302° F. for at least 70 hours. The lead systems deteriorate as is shown by comparing original and aged properties.

While it will be apparent that the invention herein disclosed is well calculated to achieve the benefits and advantages as hereinabove set forth, it will be appreciated that the invention is susceptible to modification, variation, and change without departing from the spirit thereof.

What is claimed is:

1. A vulcanizable composition comprising an active halogen-containing elastomer and a curing system consisting essentially of dimercaptothiodiazole present in an amount of from about 0.05 to about 3.0 parts by weight per 100 parts of elastomer, and a dithiocarbamate type accelerator present in an amount of from about 0.5 to about 5.0 parts by weight per 100 parts of elastomer, said dithiocarbamate type accelerator selected from the group consisting of bismuth dimethyldithiocarbamate, cadmium diamyldithiocarbamate, cadmium diethyldithiocarbamate, copper dimethyldithiocarbamate, lead diamyldithiocarbamate, lead dimethyldithiocarbamate, selenium diethyldithiocarbamate, selenium dimethyldithiocarbamate, tellurium diethyldithiocarbamate, zinc diamyldithiocarbamate, zinc di-n-butyldithiocarbamate, zinc diethyldithiocarbamate, zinc dimethyldithiocarbamate, zinc-N-ethyl phenyldithiocarbamate, zinc-N-pentamethylene dithiocarbamate, and pentamethylene-ammonium-N-pentamethylene dithiocarbamate, as well as mixtures thereof.

2. The composition of claim 1 wherein said elastomer comprises a copolymer of ethyl acrylate and vinyl chloroethyl ether.

3. The composition of claim 1 wherein said elastomer comprises a copolymer of an alkyl acrylate and vinyl chloroacetate.

4. The composition of claim 1 wherein said elastomer comprises a copolymer of ethyl acrylate and vinyl chloroacetate.

5. The composition of claim 1 wherein said elastomer comprises a terpolymer of a lower alkyl acrylate, cyanoethyl acrylate, and vinyl chloroacetate.

6. The composition of claim 5 wherein said lower alkyl acrylate comprises ethyl acrylate.

7. The composition of claim 1 wherein said dimercaptothiodiazole is present in an amount of from about 0.2 to about 1.0 parts by weight per 100 parts of elastomer, and said dithiocarbamate type accelerator is present in an amount of from about 1.5 to about 3.0 parts by weight per 100 parts of elastomer.

8. The composition of claim 1 which further includes from about 0.01 to about 3.0 parts by weight of N-(cyclohexylthio)-phthalimide per 100 parts of elastomer.

9. The composition of claim 8 wherein said N-(cyclohexylthio)-phthalimide is present in an amount of from about 0.1 to about 0.5 parts by weight per 100 parts of elastomer.

10. A vulcanized elastomer composition obtained from the composition of claim 1.

11. A vulcanized elastomer composition obtained from the composition of claim 8.

12. A process of vulcanizing a vulcanizable active halogen-containing elastomer which comprises combining said elastomer with a curing system consisting essentially of dimercaptothiodiazole present in an amount of from about 0.05 to about 3.0 parts by weight per 100 parts of elastomer, and a dithiocarbamate type accelerator present in an amount of from about 0.5 to about 5.0 parts by weight per 100 parts of elastomer; and heating said combined materials until vulcanization is completed, said dithiocarbamate type accelerator selected from the group consisting of bismuth dimethyldithiocarbamate, cadmium diamyldithiocarbamate, cadmium diethyldithiocarbamate, copper dimethyldithiocarbamate, lead diamyldithiocarbamate, lead dimethyldithiocarbamate, selenium diethyldithiocarbamate, selenium dimethyldithiocarbamate, tellurium diethyldithiocarbamate, zinc diamyldithiocarbamate, zinc di-n-butyldithiocarbamate, zinc diethyldithiocarbamate, zinc dimethyldithiocarbamate, zinc-N-ethyl phenyldithiocarbamate, zinc-N-pentamethylene dithiocarbamate, and pentamethylene-ammonium-N-pentamethylene dithiocarbamate, as well as mixtures thereof.

13. The process of claim 12 wherein said elastomer comprises a copolymer of ethyl acrylate and vinyl chloroethyl ether.

14. The process of claim 12 wherein said elastomer comprises a copolymer of an alkyl acrylate and vinyl chloroacetate.

15. The process of claim 12 wherein said elastomer is a copolymer of ethyl acrylate and vinyl chloroacetate.

16. The process of claim 12 wherein said elastomer is a terpolymer of a lower alkyl acrylate, cyanoethyl acrylate, and vinyl chloroacetate.

17. The process of claim 16 wherein said lower alkyl acrylate is ethyl acrylate.

18. The process of claim 12 wherein said dimercaptothiodiazole is present in an amount of from 0.2 to 1.0 parts by weight per 100 parts of elastomer, and said dithiocarbamate type accelerator is present in an amount of from about 1.5 to about 3.0 parts by weight per 100 parts of elastomer.

19. The process of claim 12 wherein said elastomer is further compounded with from about 0.01 to about 3.0 parts by weight of N-(cyclohexylthio)-phthalimide per 100 parts of elastomer.

20. The process of claim 19 wherein said N-(cyclohexylthio)-phthalimide is present in an amount of from about 0.1 to about 0.5 parts by weight per 100 parts of elastomer.

21. A vulcanized elastomer composition obtained by the process of claim 12.

22. A vulcanized elastomer composition obtained by the process of claim 19.

* * * * *

UNITED STATES PATENT AND TRADEMARK OFFICE
CERTIFICATE OF CORRECTION

PATENT NO. : 4,524,185
DATED : June 18, 1985
INVENTOR(S) : Robert F. Hinderer

It is certified that error appears in the above-identified patent and that said Letters Patent is hereby corrected as shown below:

Column 1, line 21, "(iiI)" should read "(iii)".

Column 2, line 37, "peferred" should read "preferred".

Column 2, line 49, "provide" should read "improve".

Column 3, line 45, "rotation" should read "reaction".

Column 4, line 8, "elastomer" should read "elastomeric".

Column 7, line 54, after "meter" insert "measured".

Column 8, line 4, "example" should read "examples".

Column 8, line 14, "(Nangard 445)" should read "(Naugard 445)".

Signed and Sealed this

Twenty-third Day of September 1986

[SEAL]

Attest:

DONALD J. QUIGG

Attesting Officer    Commissioner of Patents and Trademarks